US010542476B2

(12) United States Patent
Sudarsan et al.

(10) Patent No.: US 10,542,476 B2
(45) Date of Patent: Jan. 21, 2020

(54) SELECTING COMMUNICATION PATHS FOR APPLICATION SERVER QUERIES OF DEVICES

(71) Applicant: Nokia Solutions and Networks Oy, Espoo (FI)

(72) Inventors: Padmavathi Sudarsan, Naperville (IL); Subhasis Laha, Aurora (IL); David Rossetti, Randolph, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 98 days.

(21) Appl. No.: 15/649,021

(22) Filed: Jul. 13, 2017

(65) Prior Publication Data

US 2019/0021039 A1    Jan. 17, 2019

(51) Int. Cl.
| | |
|---|---|
| *H04B 7/00* | (2006.01) |
| *H04W 40/02* | (2009.01) |
| *H04W 28/02* | (2009.01) |
| *H04L 29/08* | (2006.01) |
| *H04W 84/04* | (2009.01) |
| *H04L 12/725* | (2013.01) |

(52) U.S. Cl.
CPC ............ *H04W 40/02* (2013.01); *H04L 67/12* (2013.01); *H04L 67/327* (2013.01); *H04W 28/0247* (2013.01); *H04L 45/306* (2013.01); *H04W 84/042* (2013.01)

(58) Field of Classification Search
CPC .......................... H04W 40/02; H04W 28/0247
See application file for complete search history.

(56) References Cited

U.S. PATENT DOCUMENTS

| 7,398,080 B2 | 7/2008 | Pyhalammi et al. |
| 7,698,409 B2 | 4/2010 | Kohonen |
| 7,787,469 B2 * | 8/2010 | Sharma ............... H04L 41/0803 370/230 |
| 9,161,179 B2 * | 10/2015 | Anchan .................... H04W 4/06 |
| 9,781,259 B1 * | 10/2017 | Kodaypak ......... H04M 3/42357 |
| 2002/0147828 A1 * | 10/2002 | Chen ...................... H04W 28/24 709/231 |

(Continued)

FOREIGN PATENT DOCUMENTS

| WO | 2004008291 A2 | 1/2004 |
| WO | 2015116681 A1 | 8/2015 |
| WO | 2016003868 A1 | 1/2016 |

*Primary Examiner* — Stephen M D Agosta

(57) ABSTRACT

An agent is configured to receive queries from an application server in a communication network. The queries are directed to one or more devices in the communication network. The agent selects a communication path for a device from a plurality of communication paths from the application server to the device. The communication path is selected based on a data size that is to be sent to the device as part of the query, a number of devices that are to receive the query, or a combination thereof. The agent transmits the query via the selected communication path. The communication path can be selected based on one or more of a time criticality of the query, a subscription class of a user of the device, a category of a type of the device, an operator-defined influence factor, network conditions along the communication path, a broadcast flag in the query, or a combination thereof.

17 Claims, 10 Drawing Sheets

(56) References Cited

U.S. PATENT DOCUMENTS

| | | | |
|---|---|---|---|
| 2006/0209937 A1* | 9/2006 | Tanaka | H04L 1/0003 375/219 |
| 2007/0121503 A1* | 5/2007 | Guo | H04L 41/0896 370/230 |
| 2012/0044952 A1* | 2/2012 | Ono | H04L 12/40065 370/463 |
| 2012/0099514 A1* | 4/2012 | Bianchetti | H04N 21/41422 370/312 |
| 2012/0120961 A1* | 5/2012 | Yang | H04W 40/28 370/400 |
| 2012/0124201 A1 | 5/2012 | Muhanna et al. | |
| 2013/0142118 A1* | 6/2013 | Cherian | H04W 4/70 370/328 |
| 2013/0227138 A1* | 8/2013 | Cai | H04W 12/08 709/225 |
| 2015/0271247 A1* | 9/2015 | Patsiokas | H04W 4/70 709/217 |
| 2016/0334841 A1* | 11/2016 | Huang | G06F 1/203 |
| 2017/0048739 A1 | 2/2017 | Jeong et al. | |

\* cited by examiner

| U-PLANE<br>DATA BEARER<br>MEDIUM/HIGH DATA RATE | | | | C-PLANE<br>BEARER-LESS, DATA OVER NAS<br>LOW DATA RATE | | | | |
|---|---|---|---|---|---|---|---|---|
| S1-U<br>eNB <> GW | | | | S11-U<br>MME <> GW: GTP TUNNEL | | | T6-a<br>MME <> SCEF | |
| GTP<br>eNB <> SGW <> PGW | | | | GTP<br>eNB <> MME <> SGW <> PGW | | | DIAMETER<br>INTERFACE | |
| IP | | NON-IP | | IP | | NON-IP | NON-IP | SMS |
| REGULAR IP COMMUNICATION OVER SG-I INTERFACE | | UDP/IP TUNNEL PGW <> AS UE IDENTIFIED BY UDP PORT | | REGULAR IP COMMUNICATION OVER SG-I INTERFACE | | UDP/IP TUNNEL PGW <> AS UE IDENTIFIED BY UDP PORT | T6-a: BEARER ID ASSIGNED TO IDENTIFY UE TRAFFIC BY MME AND SCEF | |
| | | | | | | | IP | NON-IP |
| | | | | | | | IMS-BASED SMS | 3G MSC OR MSC-IWF TO EXCHANGE SMS |

SELECTING COMMUNICATION PATHS FOR APPLICATION SERVER QUERIES OF DEVICES

BACKGROUND

The "Internet of Things" (IoT) is designed to support internetworking of physical devices such as appliances, vehicles, buildings, and other items that are embedded with electronics, software, sensors, actuators, and network connectivity that enable the devices to collect and exchange data over the Internet. Application servers in the IoT ecosystem provide information or instructions to devices in the IoT ecosystem by transmitting queries. Queries can be used to initiate actions such as data collection by the devices, to request transmission of the collected data from the devices to the application server, to provide data such as software upgrades to the devices, to notify devices of upcoming broadcast transmissions from the application server, and the like. The IoT ecosystem involves a diverse user base that spans numerous vertical markets including industrial applications, smart homes, telematics, wearables, connected cars, utilities, healthcare, and the like. The characteristics of the queries transmitted to devices in different markets can vary significantly. For example, a query can include relatively small number of bytes that are transmitted to a single device in a non-time-critical query (e.g., a request to turn on the air conditioning in a connected car) or the query could include a relatively large number of bytes that are transmitted to numerous devices in a mission critical query (e.g., transmitting an alert to smart homes, connected cars, cell phones, and wearable devices located in the path of a tornado).

A large (and rapidly growing) number of IoT devices support cellular access, e.g., according to standards defined by the Third Generation Partnership Project (3GPP). For example, approximately 20% of IoT devices are expected to support cellular technology by 2020, which corresponds to an estimated 4 to 10 billion cellular-enabled IoT devices. Wireless networks that support cellular access (potentially in combination with other networks such as Wi-Fi networks) provide multiple communication paths between application servers and cellular-enabled devices. Data bearers can be established in the user plane to provide a communication path for transmitting queries at medium to high data rates. Bearer-less communication paths can be established in the control plane for transmitting queries at low data rates. For example, non-access stratum (NAS) signaling can be used to transmit queries via a service capability exposure function (SCEF) or a short message service (SMS) server. In wireless networks that support Wi-Fi, application servers can also transmit queries along a communication path that includes a wireless local area network (WLAN) gateway and a Wi-Fi access point. Queries can also be unicast, multicast, or broadcast.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, a method is provided including receiving, at an agent and from an application server in a communication network, a query directed to a device in the communication network. The method also includes selecting, at the agent, a communication path from a plurality of communication paths from the application server to the device. The communication path is selected based on a data size that is to be sent to the device as part of the query, a number of devices that are to receive the query, or a combination thereof. The method also includes transmitting, from the agent, the query via the selected communication path.

In some embodiments, selecting the communication path includes selecting a communication path based upon whether the communication path is supported by a cellular or a non-cellular radio access technology.

In some embodiments, the method includes accessing, at the agent, first information indicating time criticality of the query. Selecting the communication path includes selecting the communication path based on whether the first information indicates that the query is a mission critical query having a high priority for transmission in a current time interval, a time critical query having a medium priority for transmission in the current time interval, a delay tolerant query having a low priority for transmission in the current time interval, or a combination thereof.

In some embodiments, the method includes accessing second information indicating at least one of a subscription class of a user of the device, a category of a type of the device, an operator-defined influence factor, or a combination thereof. The method also includes using the second information to determine an order of a plurality of queries including the query.

In some embodiments, the method includes associating the plurality of queries with timing categories based on the first information. Using the second information to determine the order of the plurality of queries includes using the second information to determine orders for the queries in the timing categories.

In some embodiments, selecting the communication path for the query includes selecting communication paths for the plurality of queries in the order determined based on the second information.

In some embodiments, the method includes accessing third information indicating network conditions along the communication path and selectively admitting the query for transmission along the communication path in a current time interval or queuing the query for transmission in a subsequent time interval based on the third information.

In some embodiments, selecting the communication path from the plurality of communication paths includes selecting a control plane communication path in response to the query having the data size that is below a first threshold.

In some embodiments, selecting the control plane communication path includes selecting a control plane communication path including a service capability exposure function (SCEF) in response to the number of devices receiving the query exceeding a second threshold.

In some embodiments, selecting the control plane communication path includes selecting a control plane communication path including a short message service (SMS) server in response to the number of devices receiving the query being below a second threshold.

In some embodiments, transmitting the query via the selected communication path includes transmitting non-access stratum (NAS) signaling representative of the query.

In some embodiments, selecting the communication path from the plurality of communication paths includes selecting a user plane communication path in response to the query having the data size that is above a first threshold.

In some embodiments, the query is a non-mission critical query and selecting the communication path from the plurality of communication paths includes selecting the user plane communication path in response to the non-mission critical query having the data size that is above the first threshold and below a third threshold.

In some embodiments, selecting the communication path from the plurality of communication paths includes selecting a non-cellular communication path in response to the non-mission critical query having the data size that is above the third threshold.

In some embodiments, the method includes establishing a bearer for the user plane communication path and transmitting the query includes transmitting the query using the bearer.

In some embodiments, selecting the communication path includes receiving an indication that the query is to be broadcast and providing the query to a multimedia broadcast/multicast service (MBMS) server for broadcast.

In some embodiments, an apparatus is provided that includes network hardware configured to receive a query from an application server in a communication network. The query is directed to a device in the communication network. The apparatus also includes computing hardware configured to select a communication path from a plurality of communication paths from the application server to the device. The communication path is selected based on a size of data that is to be sent to the device as part of the query and a number of devices that are to receive the query. The network hardware is configured to transmit the query via the selected communication path.

In some embodiments, the computing hardware is configured to select a communication path supported by a cellular or a non-cellular radio access technology.

In some embodiments, the apparatus includes storage hardware configured to store first information indicating time criticality of the query. The computing hardware is configured to select the communication path based on whether the first information indicates that the query is a mission critical query having a high priority for transmission in a current time interval, a time critical query having a medium priority for transmission in the current time interval, or a delay tolerant query having a low priority for transmission in the current time interval.

In some embodiments, the storage hardware is configured to store second information indicating at least one of a subscription class of a user of the device, a category of a type of the device, and an operator-defined influence factor. The computing hardware is configured to use the second information to determine an order of a plurality of queries including the query.

In some embodiments, the computing hardware is configured to associate the plurality of queries with timing categories based on the first information and use the second information to determine orders for the queries in the timing categories.

In some embodiments, the computing hardware is configured to select communication paths for the plurality of queries in the order determined based on the second information.

In some embodiments, the storage hardware is configured to store third information indicating network conditions along the communication path and the computing hardware is configured to selectively admitting the query for transmission along the communication path in the current time interval or queuing the query for transmission in a subsequent time interval based on the third information.

In some embodiments, the computing hardware is configured to select a control plane communication path in response to the query having the data size that is below a first threshold.

In some embodiments, the computing hardware is configured to select a control plane communication path including a service capability exposure function (SCEF) in response to the number of devices receiving the query exceeding a second threshold.

In some embodiments, the computing hardware is configured to select a control plane communication path including a short message service (SMS) server in response to the number of devices receiving the query being below a second threshold.

In some embodiments, the network hardware is configured to transmit non-access stratum (NAS) signaling representative of the query.

In some embodiments, the computing hardware is configured to select a user plane communication path in response to the query having the data size that is above a first threshold.

In some embodiments, the query is a non-mission critical query and the computing hardware is configured to select the user plane communication path in response to the non-mission critical query having the data size that is above the first threshold and below a third threshold.

In some embodiments, the computing hardware is configured to select a non-cellular communication path in response to the non-mission critical query having the data size that is above the third threshold.

In some embodiments, the network hardware is configured to establish a bearer for the user plane communication path and transmit the query using the bearer.

In some embodiments, the network hardware is configured to receive an indication that the query is to be broadcast and provide the query to a multimedia broadcast/multicast service (MBMS) server for broadcast.

In some embodiments, a method is provided that includes receiving, from at least one application server in a communication network, queries directed to devices in the communication network. The method also includes selectively admitting the queries for transmission along different communication paths from the application server to the devices in response to the queries including different data sizes that are to be sent to the devices. The different communication paths are selected based on numbers of the devices that are to receive the queries. The method also includes transmitting the queries via the selected communication paths.

In some embodiments, the method also includes associating the queries with timing categories based on time criticalities of the queries and ordering the queries in the timing categories based on at least one of a subscription class of users of the devices, categories of types of the devices, and operator-defined influence factors for the devices. Selectively admitting the queries includes selectively admitting the queries in the timing categories in the determined order.

In some embodiments, selectively admitting the queries for transmission includes admitting the queries for transmission via a control plane communication path in response to the queries having a data size that is below a first threshold and admitting the queries for transmission via a user plane communication path in response to the queries having the data size that is above the first threshold.

In some embodiments, selectively admitting the queries for transmission includes admitting the queries for transmission via the control plane communication path including a service capability exposure function (SCEF) in response to the number of devices receiving the query exceeding a second threshold and admitting the queries for transmission via the control plane communication path including a short message service (SMS) server in response to the number of devices receiving the query being below the second threshold.

In some embodiments, one of the queries is a non-mission critical query and selectively admitting the queries includes selectively admitting the non-mission critical query for transmission via a user plane communication path in response to the non-mission critical query having the data size that is above a first threshold and below a third threshold.

In some embodiments, selectively admitting the queries includes selecting admitting the non-mission critical query for transmission via a non-cellular communication path in response to the non-mission critical query having the data size that is above the third threshold.

In some embodiments, selectively admitting the queries for transmission includes selectively admitting the queries for transmission along communication paths supported by a cellular or a non-cellular radio access technology.

In some embodiments, selectively admitting the queries for transmission includes providing the queries to a multimedia broadcast/multicast service (MBMS) server for broadcast in response to receiving an indication that the queries are to be broadcast.

In some embodiments, a non-transitory computer readable medium embodying a set of executable instructions is provided. The set of executable instructions is to manipulate a processor to receive, from an application server in a communication network, a query directed to a device in the communication network and select a communication path from a plurality of communication paths from the application server to the device. The communication path is selected based on a data size that is to be sent to the device as part of the query, a number of devices that are to receive the query, or a combination thereof. The set of executable instructions is also to manipulate the processor to transmit the query via the selected communication path.

In some embodiments, a system is provided that includes a device, an application server, and a communication network that supports a plurality of communication paths from the application server to the device. The system also includes an agent configured to receive a query from the application server, select a communication path from the plurality of communication paths based on a data size that is to be sent to the device as part of the query, a number of devices that are to receive the query, or a combination thereof, and transmit the query via the selected communication path.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 3 includes a table that summarizes the types of communication paths that are available in a wireless communication system according to some embodiments.

DETAILED DESCRIPTION

Figure 1:
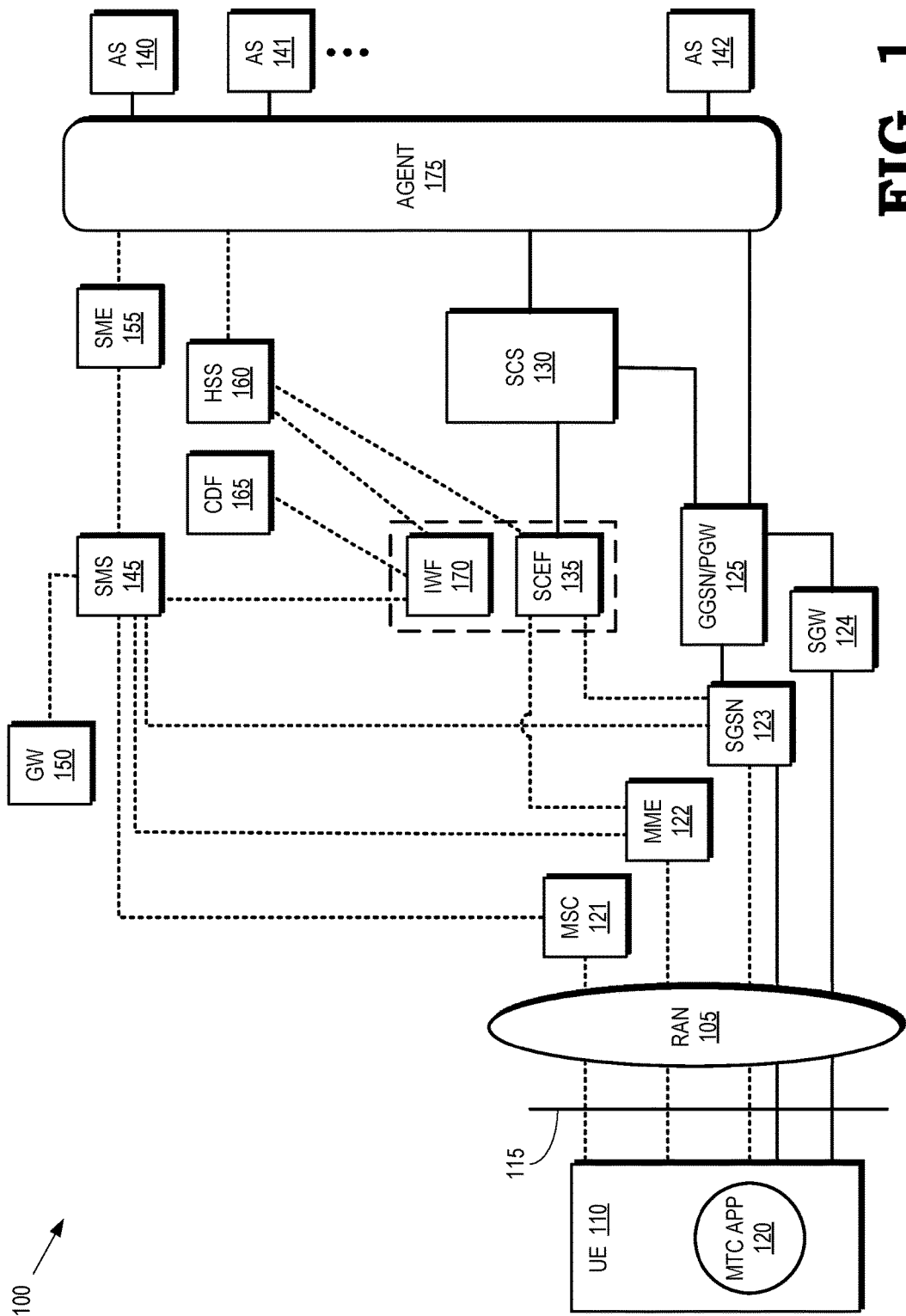
FIG. 1 illustrates a first example of a wireless communication system according to some embodiments.

Although there are numerous options for communication paths between application servers and devices in the IoT ecosystem, conventional application servers are not able to dynamically select from among the available communication paths. For example, application servers in different vertical markets can range from fairly simple implementations to highly sophisticated implementations and it is not practical for each application server to include integrated logic to perform optimized path selection dynamically on a per-query basis. To the contrary, conventional application servers use a static configuration that allocates a predetermined communication path for transmitting queries to each type of device. Thus, conventional application servers are not able to choose different communication paths for different types of queries that are transmitted to the same device. Conventional application servers are also not able to choose different communication paths for queries generated by different types of applications. Furthermore, conventional application servers are unaware of network conditions and are therefore unable to respond to changes in the network such as dynamic variations in traffic patterns, which can vary unpredictably from small sporadic bursts to massive traffic spikes.

FIGS. 1-10 disclose embodiments of a path selection agent that is configured to receive a query from an application server and choose a communication path to one or more devices based on a size of data that is to be sent to the device as part of the query and a number of devices that are to receive the query. The path selection agent is also able to choose the communication path based on a measure of time criticality of the query. For example, the path selection agent can choose the communication path based on whether the query is mission-critical (high priority for transmission in the current time interval), time-critical (medium priority for transmission in the current time interval), or delay tolerant (low priority for transmission in the current time interval). The path selection agent can also order the queries in each timing category for assignment to a communication path based on a subscription class for users of the devices that receive the queries, device type categories, or operator defined influence factors. The path selection agent then assigns communication paths to the queries in the determined order. Once a communication path is assigned to a query, the query is admitted for transmission along the communication path in the current time interval or queued to be considered for transmission in a subsequent time interval depending on current network conditions along the assigned communication path. In some embodiments, the time intervals for the evaluation are on the order of seconds. In some cases, the path selection agent determines that the query should be broadcast, in which case conventional multimedia broadcast/multicast services (MBMS, eMBMS) are used to broadcast the query.

To assign communication paths to the queries, some embodiments of the path selection agent assign cellular communication paths to mission-critical queries that are directed to a cellular-enabled device. Queries having a data size that is over a first threshold are transmitted over the user plane, which requires establishing a bearer to convey the queries over the communication path. Mission critical queries having a data size that is below the first threshold are transmitted over the control plane, which does not require establishing a bearer. The query is transmitted over the control plane via SCEF if the number of devices receiving the query exceeds a second threshold and the query is transmitted over the control plane via SMS if the number of devices receiving the query is below the second threshold. Non-mission-critical queries to cellular-enabled devices are selectively assigned to a cellular communication path or a non-cellular communication path based on a data size of the query. Non mission critical queries having a data size that is below a third threshold are transmitted in the control plane via SCEF if the number of devices receiving the query is above a fourth threshold or via SMS if the number of devices receiving the query is below the fourth threshold. Queries having a data size that is above the third threshold and below a fifth threshold are transmitted over the user plane. Queries having a data size that is above the fifth threshold can be transmitted using another (non-cellular) radio access technology (RAT) such as Wi-Fi, if available. Some embodiments of the device support multiple RATs. If a query cannot be considered in one of the supported RATs, then the query is evaluated for admission on another RAT.

FIG. 1 illustrates a first example of a wireless communication system 100 according to some embodiments. The wireless communication system 100 includes a radio access network (RAN) 105 that provides wireless connectivity to one or more user equipment 110 (only one user equipment is illustrated in FIG. 1 in the interest of clarity) within a geographic area or cell over a corresponding air interface 115. The radio access network 105 can implement one or more base stations (not shown in FIG. 1). As used herein, the term "base station" refers to any entity or device capable of providing wireless connectivity including eNodeBs, macrocells, access points, small cells, microcells, picocells, femtocells, and the like. As used herein, the term "user equipment" refers to any device or entity capable of accessing network services by establishing a wireless connection over the air interface 115 with the radio access network 105. For example, the user equipment 110 can include devices that are used to facilitate communication between people, such as cell phones, smart phones, tablet computers, wireless-enabled laptops, and the like. For another example, the user equipment 110 can include physical devices such appliances, vehicles, buildings, and other items that are embedded with electronics, software, sensors, actuators, and network connectivity that enable the devices to collect and exchange data over the Internet. The user equipment 110 can therefore be used as part of an "Internet of Things."

In the illustrated embodiment, the user equipment 110 implements a machine type communication (MTC) application 120. The user equipment 110 can use the MTC application 120 to implement applications that are characterized by fully automatic data generation, exchange, processing, and actuation without human intervention or with relatively low input from a user. Although a single MTC application 120 and a single user equipment 110 are depicted in FIG. 1, the wireless communication system 100 can provide wireless connectivity to large numbers (e.g., tens of thousands) of MTC applications communicating with a large number of user equipment (tens of billions). The wireless communication system 100 is therefore required to provide high availability, low latency, and high reliability for a wide variety of user equipment queries, device types, operator configurations, network conditions, and the like. For example, queries transmitted to the user equipment 110 can be treated differently based on application characteristics such as time criticality, size of data transmitted to and from the user equipment 110, a subscriber profile, a number of other devices involved in the query, requirements for reliability, and the like.

The wireless communication system 100 includes numerous network elements that support different communication paths to the user equipment 110. The communication paths include control plane paths (dotted lines) and user plane paths (solid lines). As used herein, the term "control plane" refers to the portion of the wireless communication system 100 that defines the network topology for routing packets through the wireless communication system 100. Non-access stratum (NAS) signaling can be used to convey relatively small amounts of information at a low data rate over the control plane paths without establishing radio bearers. As used herein, the term "user plane" refers to the portion of the wireless communication system 100 that is responsible for routing packets from one endpoint to another. The user plane can also be referred to as the data plane or the forwarding plane. A user plane path is associated with a radio bearer that defines the characteristics of a link between the endpoints of the user plane path. For example, in order to provide quality of service (QoS), a user plane path is associated with a radio bearer that specifies the configuration of a link layer and a physical layer implemented by the endpoints. User plane paths are used to convey packets including relatively large amounts of information at medium or high data rates.

In some embodiments, control plane paths or user plane paths are made up of one or more sub-paths that operate according to different protocols or technologies. For example, a control plane path or a user plane path can include one or more wired sub-paths (i.e., a portion of a path that connects entities using a conductive physical medium such as wires, cables, traces, and the like) and one or more wireless sub-paths (i.e., a portion of a path that connects entities using signals transmitted over an air interface). Characteristics of the sub-paths can influence the capacity, availability, latency, or other characteristics of the corresponding control plane path or user plane path. The sub-paths that make up a control plane path or user plane path can be determined by characteristics of the network. For example, a portion of the control plane paths or user plane paths to the user equipment 110 can include a wireless sub-path to convey information over the air interface in a wireless communication network. In some embodiments, the sub-paths that are available to convey information to the user equipment 110 depend on availability of the user equipment 110 via the sub-paths. For example, the availability of a wireless sub-path depends on the status of the radios implemented in the user equipment 110. The status can include an indication of whether the radio is on or off, receiving (listening) or transmitting, and the like.

In the illustrated embodiment, the radio access network 105 is connected to a mobile switching center (MSC) 121, a mobility management entity (MME) 122, and a serving GPRS support node (SGSN) 123 by corresponding control plane paths. The MSC 121 controls network switching subsystem elements for the wireless communication system 100. The MME 122 is responsible for paging idle user equipment, performing bearer activation/deactivation, authenticating user equipment, and the like. The MME 122 is also a terminating node for NAS signaling. The SGSN 123 serves the user equipment 110 and is responsible for conveying data packets to and from the user equipment 110 within a corresponding geographic area. The SGSN 123 performs packet routing and transfer, mobility management, logical link management, authentication, and charging functions.

In the illustrated embodiment, the radio access network 105 is also connected to the SGSN 123 and a serving gateway 124 by corresponding user plane paths. The serving gateway 124 routes and forwards data packets for the user equipment 110. The serving gateway 124 can act as a mobility anchor for the user plane during handover between base stations. The serving gateway 124 can also terminate a downlink user plane path to an idle user equipment and trigger paging of the user equipment 110 when downlink data arrives for the user equipment 110. The serving gateway 124 manages and stores contexts for the user equipment 110, which include parameters that define one or more bearers, network internal routing information, and the like. The SGSN 123 and the serving gateway 124 are connected to a gateway GPRS serving node (GGSN) and packet data node (PDN) gateway (PGW) 125 by corresponding user plane paths. The GGSN/PGW 125 provides connectivity from the user equipment 110 to external packet data networks.

The GGSN/PGW 125 communicates with a service capability server (SCS) 130 over a corresponding user plane path. The SCS 130 provides middleware that serves third-party value-added services and applications. The SCS 130 can be owned or leased by a mobile network operator or other network service provider and is accessible through application programming interfaces (APIs). The SCS 130 also communicates with a service capability exposure function (SCEF) 135 over a corresponding user plane path. The SCEF 135 is configured to securely expose the services and capabilities provided by network interfaces in the wireless communication system 100. For example, the SCEF 135 can provide an interface for small data transfers and control messaging between the user equipment 110 and one or more application servers 140, 141, 142 (collectively referred to herein as "the application servers 140-142"). The SCEF 135 provides APIs to the application servers 140-142 for the small data transfers and control messages.

The wireless communication system 100 also includes a short message service (SMS) server 145 that is used to receive, store, and transmit SMS messages, which can be short messages that are constrained to include a maximum of 160 alphanumeric characters. The SMS server 145 can receive and transmit the SMS messages along control plane paths. For example, the SMS server 145 can receive SMS messages from an Internet protocol short message gateway (GW) 150 or a short message entity (SME) 155 via corresponding control plane paths. For example, SMS messages generated by one or more of the application servers 140-142 can be conveyed along control plane paths to the SME 155, the SMS server 145, the MSC 121 or MME 122 or SGSN 123, the radio access network 105, and the user equipment 110.

A home subscriber server (HSS) 160 is a master user database that stores subscription-related information such as subscriber profiles associated with the user equipment 110. The HSS 160 also performs authentication and authorization of users and provides location and IP information for the user. A charging data function (CDF) 165 is used to gather charging information for online charging or off-line charging for usage of the resources of the wireless communication system 100 by the user equipment 110. The CDF 165 can use the charging information to generate a call detail record (CDR), which can be sent to a billing system for the wireless communication system 100. In the illustrated embodiment, control plane paths are used for communication between an interworking function (IWF) 170 and the HSS 160 or the CDF 165. The HSS 160 can also communicate with the SCEF 135 over a corresponding control plane path.

As discussed herein, the user plane paths in the wireless communication system 100 requires establishment of corresponding bearers that provide connection segments between nodes in the wireless communication system 100. The bearers are defined by a set of characteristics that specify configuration of a physical layer and a data link layer in the terminating nodes. The bearers also define channels between the data link layer and higher layers for transfer of user or control data. For example, the user equipment 110 and the radio access network 105 are terminating endpoints of a radio bearer that utilizes the air interface 115. The radio bearer is defined by characteristics stored in the user equipment 110 and the radio access network 105. For another example, the user equipment 110 and the serving gateway 124 are terminating endpoints of a radio access bearer that is defined by characteristics stored in the user equipment 110 and the serving gateway 124. For yet another example, the serving gateway 124 and the GGSN/PGW 125 are terminating endpoints of a S5/S8 bearer 155 that is defined by characteristics stored in the serving gateway 124 and the GGSN/PGW 125.

An agent 175 is implemented between the application servers 140-142 and the other entities of the wireless communication system 100. The agent 175 is used to intelligently select communication paths for queries that are generated by the application servers 140-142 and directed to the user equipment 110. Some embodiments of the agent 175 are configured to receive queries from the application servers 140-142. The queries are addressed or targeted to the user equipment 110. The agent 175 is configured to select a communication path from among the set of communication paths that are available to convey information from the application servers 140-142 to the user equipment 110. For example, the agent 175 can select from among the various user plane and control plane paths through the entities of the wireless communication system 100. The communication path is selected based on a size of data that is to be sent to the user equipment 110 as part of the query and a number of devices (including the user equipment 110) that are to receive the query. The agent 175 can then transmit the query via the selected communication path. Some embodiments of the agent 175 can also select the communication path based on other factors including time criticality of the query, influence factors, device types, application types, network conditions, status of the network elements, learned patterns of device behavior, device radio status, and the like, as discussed in detail below.

Figure 2:
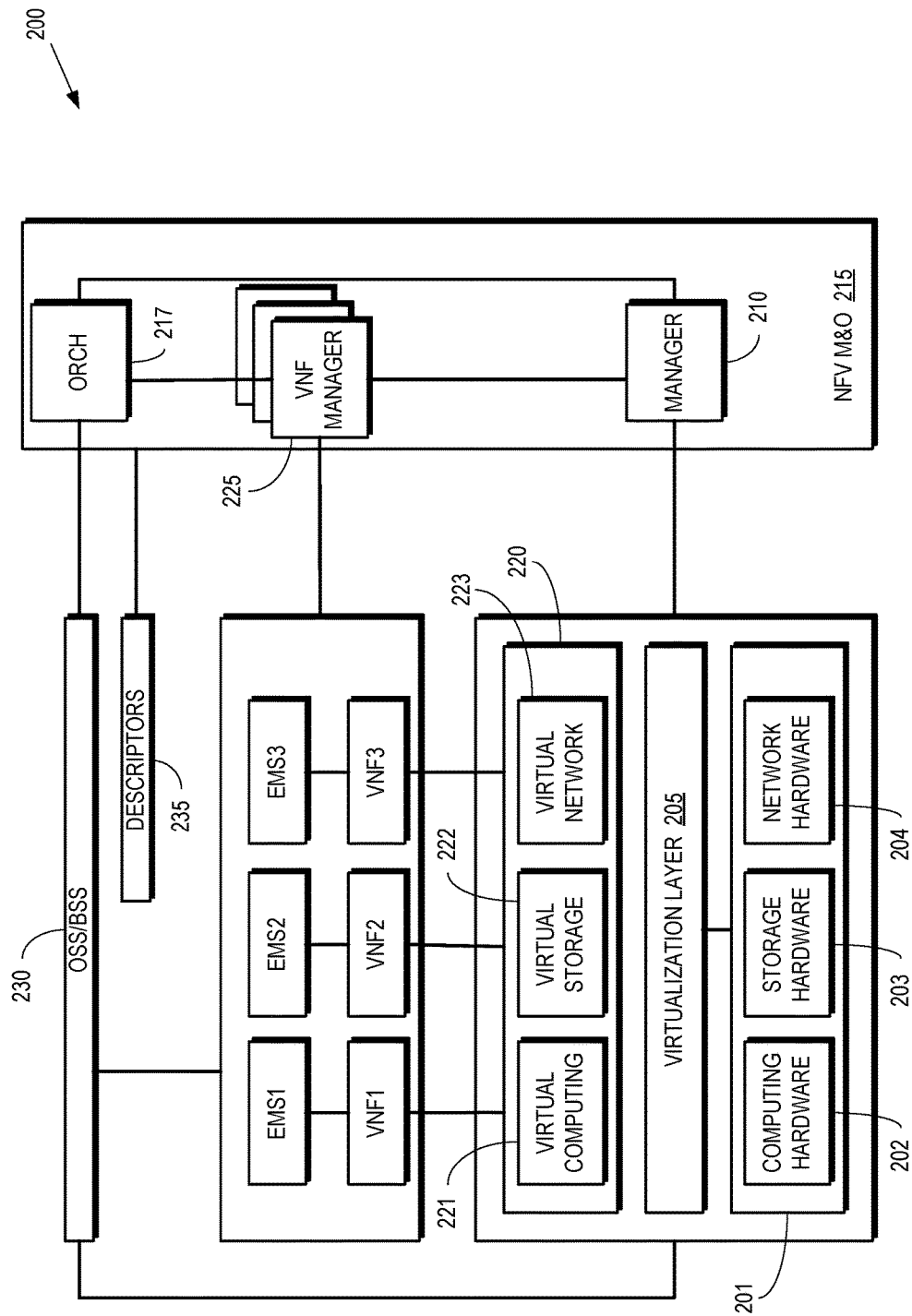
FIG. 2 is a block diagram of a network function virtualization (NFV) architecture according to some embodiments.

FIG. 2 is a block diagram of an NFV architecture 200 according to some embodiments. The NFV architecture 200 is used to implement some embodiments of the agent 175 and, in some cases, other network elements within the wireless communication system 100 shown in FIG. 1. The NFV architecture 200 includes hardware resources 201 including computing hardware 202, storage hardware 203, and network hardware 204. A virtualization layer 205 provides an abstract representation of the hardware resources 201. The abstract representation supported by the virtualization layer 205 can be managed using a virtualized infrastructure manager 210, which is part of the NFV management and orchestration (M&O) module 215. Some embodiments of the manager 210 are configured to collect and forward performance measurements and events that may occur in the NFV architecture 200. For example, performance measurements may be forwarded to an orchestrator (ORCH) 217 implemented in the NFV M&O 215. The hardware resources 201 and the virtualization layer 205 may be used to implement virtual resources 220 including virtual computing 221, virtual storage 222, and virtual networking 223.

Virtual networking functions (VNF1, VNF2, VNF3) run over the NFV infrastructure (e.g., the hardware resources 201) and utilize the virtual resources 220. For example, the virtual networking functions (VNF1, VNF2, VNF3) may be implemented using virtual machines supported by the virtual computing resources 221, virtual memory supported by the virtual storage resources 222, or virtual networks supported by the virtual network resources 223. Element management systems (EMS1, EMS2, EMS3) are responsible for managing the virtual networking functions (VNF1, VNF2, VNF3). For example, the element management systems (EMS1, EMS2, EMS3) may be responsible for fault and performance management. In some embodiments, each of the virtual networking functions (VNF1, VNF2, VNF3) is controlled by a corresponding VNF manager 225 that exchanges information and coordinates actions with the manager 210 or the orchestrator 217.

The NFV architecture 200 may include an operation support system (OSS)/business support system (BSS) 230. The OSS/BSS 230 deals with network management including fault management using the OSS functionality. The OSS/BSS 230 also deals with customer and product management using the BSS functionality. Some embodiments of the NFV architecture 200 use a set of descriptors 235 for storing descriptions of services, virtual network functions, or infrastructure supported by the NFV architecture 200. For example, the descriptors 235 can be used to store descriptions of a virtual network function implementation of the agent 175 shown in FIG. 1. Information in the descriptors 235 may be updated or modified by the NFV M&O 215.

The NFV architecture 200 can be used to implement network slices that provide user plane or control plane functions. A network slice is a complete logical network that provides communication services and network capabilities, which can vary from slice to slice. User equipment can concurrently access multiple slices. Some embodiments of user equipment provide Network Slice Selection Assistance Information (NSSAI) parameters to the network to assist in selection of a slice instance for the user equipment. A single NSSAI may lead to the selection of several slices. The NFV architecture 200 can also use device capabilities, subscription information and local operator policies to do the selection. An NSSAI is a collection of smaller components, Single-NSSAIs (S-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several network slice instances of the same type, e.g. to isolate traffic related to different services into different slices.

FIG. 3 includes a table 300 that summarizes the types of communication paths that are available in a wireless communication system according to some embodiments. The communication paths summarized in the table 300 are implemented in some embodiments of the wireless communication system 100 shown in FIG. 1. As shown in table 300, the communication paths include user plane paths that require a data bearer and support data transmission at a medium or high data rate and control plane paths that do not require a bearer. The control plane paths can be data using NAS signaling at a relatively low data rate.

User plane paths include paths conveyed over an S1-U interface between a base station (eNB) and a gateway such as a serving gateway or a PDN gateway. In some embodiments, data packets are conveyed using a tunnel that is established according to the General Packet Radio Service (GPRS) Tunneling Protocol (GTP). For example, a GTP tunnel can be established between the base station, a serving gateway, and a PDN gateway. Packets can be conveyed according to IP over an SG-i interface or using non-IP protocols, e.g., by establishing a user datagram protocol (UDP)/IP between a PDN gateway and an application server. In this case, the user equipment can be identified by a UDP port number.

Control plane paths include paths conveyed over an S11-U interface using a GTP tunnel, e.g., a tunnel that extends over a base station, an MME, a serving gateway, and a PDN gateway. Packets can be conveyed according to IP over an SG-i interface or using non-IP protocols. Control plane paths can also include paths conveyed over a T6-a interface between an MME and an SCEF, which can be established according to a Diameter protocol that provides a security architecture for distributed systems to control user access to services. The packets are conveyed according to a non-IP protocol in which a bearer identifier is assigned to identify user traffic between the MME and the SCEF. Control plane paths can also include paths conveyed via a short message system. The SMS messages can be conveyed according to IP using an Internet multimedia subsystem (IMS) protocol or using a non-IP protocol in which an MSC or an IWF are used to transmit the SMS messages.

Figure 4:
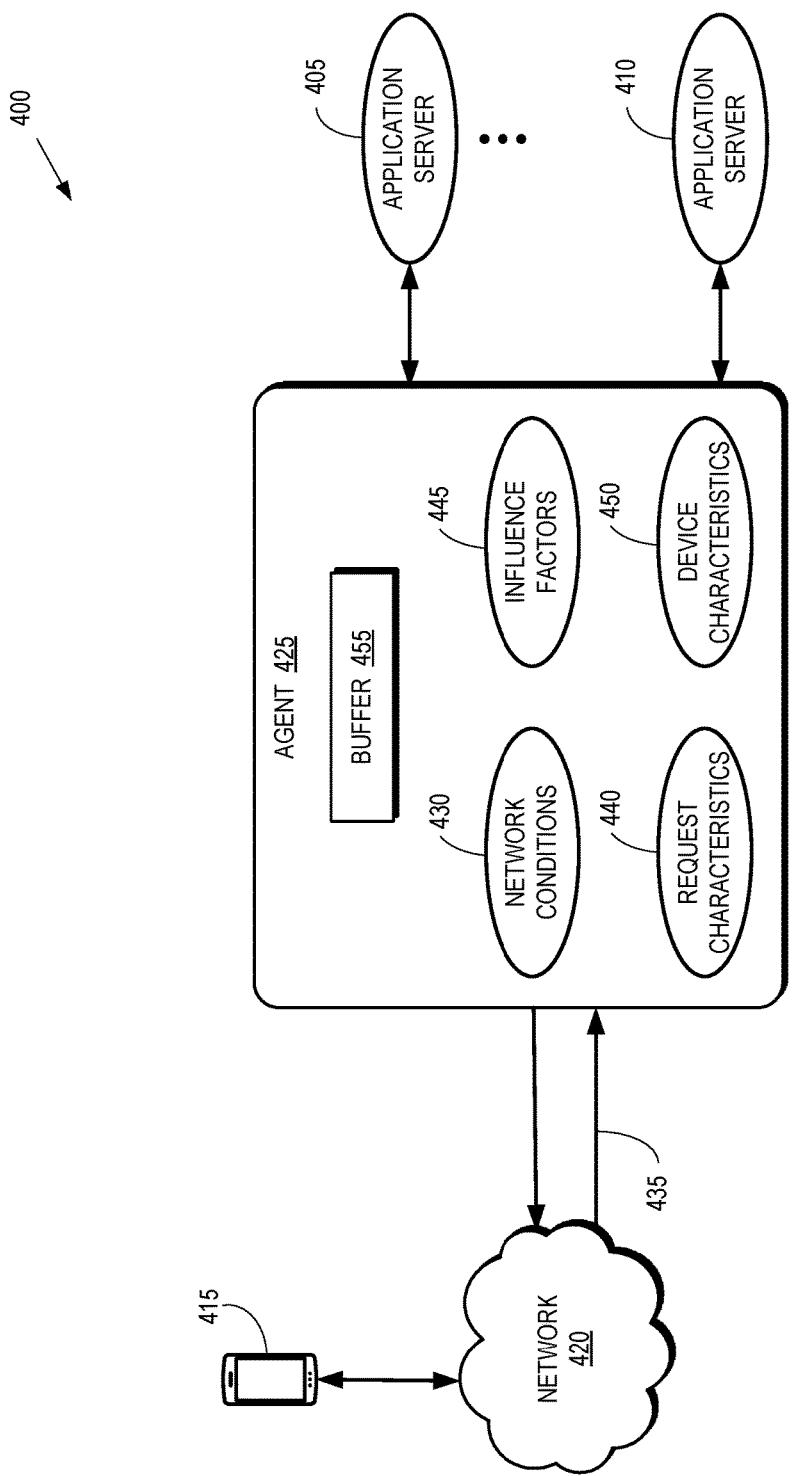
FIG. 4 is a block diagram of a second example of a wireless communication system according to some embodiments.

FIG. 4 is a block diagram of a second example of a wireless communication system 400 according to some embodiments. The wireless communication system 400 is used to implement some embodiments of the wireless communication system 100 shown in FIG. 1. The wireless communication system 400 supports communication between one or more application servers 405, 410 and one or more user equipment 415. For example, the wireless communication system 400 includes a network 420 provides multiple communication paths to the user equipment 415. As discussed herein, the communication paths can include user plane paths and control plane paths through different combinations of network entities such as those shown in FIG. 1.

The wireless communication system 400 includes an agent 425 that is configured to select communication paths for queries received from the application servers 405, 410. The communication paths are selected on a per-query basis. For example, different queries from the same application server 405, 410 to the same user equipment 415 can be assigned to different communication paths for transmission to the user equipment 415 via the network 420. However, the agent 425 is not required to select different communication paths for each query. For example, different queries from the same application server 405, 410 can be assigned to the same communication path for transmission to the same user equipment 415 via the network 420. The agent 425 selects the communication paths based on various characteristics associated with the query, as discussed herein.

Some embodiments of the agent 425 store (or have access to) information indicating network conditions 430. For example, the network conditions 430 can indicate the current or historical load in one or more network elements of the network 420. Information indicating network conditions 430 can be received in feedback 435 transmitted from the network elements in the network 420. The feedback 435 can be provided at predetermined time intervals, periodically, regularly, according to a predetermined schedule, or in response to a request from the agent 425. Individual entities in the network 420 can independently provide feedback 435 to the agent 425. The network conditions 430 can also indicate a current or historical state of one or more of the network elements, such as information indicating a failure of the network element.

Some embodiments of the agent 425 store (or have access to) information indicating request characteristics 440 that define characteristics of the queries received from the application servers 405, 410. The request characteristics 440 can indicate time criticality of the query, such as whether the query is mission-critical, time critical, delay tolerant, or a combination thereof. In some embodiments, the time criticality of the query is modifiable in response to signals transmitted by the user equipment 415. For example, the user equipment 415 can transmit a message to change the time criticality of a buffered query from time critical to delay tolerant. The request characteristics 440 can also indicate a size of the data included in the query. For example, the request characteristics 440 can indicate a number of bytes of data associated with the query. The request characteristics 440 can also indicate a degree of reliability associated with the query. The request characteristics 440 can further indicate a number of devices that are receiving the query. The agent 425 can infer the request characteristics 440 from the query itself or the request characteristics 440 can be provided by the application servers 405, 410.

Some embodiments of the agent 425 store (or have access to) information indicating values of influence factors 445 associated with the query. Service providers can define different subscription classes and the agent 425 can select the communication path based on the subscription class. An example of a table for defining subscriber influence factors based on subscription classes is provided below:

| Subscription Class | Influence factor SubIF |
|---|---|
| Platinum | 50 |
| Gold | 30 |
| Silver | 20 |
| Bronze | 10 |
| Limited | 10-50 |
|  | (adjusted based on usage) |

Note:
Subscription level maybe adjusted after a certain level of usage; for example, for the first 10 GB of data usage the subscriber maybe at a Platinum level but maybe dropped to Bronze after crossing 10 GB of data usage.

Different categories of devices can also be associated with different influence factors. An example of a table for defining device type categories (DTC) influence factors is provided below:

| Device Type Category | Influence factor DtcIF |
|---|---|
| Home GW | 40 |
| Industrial GW | 30 |
| Municipality owned devices (residential) | 10 |
| Municipality controlled devices in public places | 20 |

The influence factors 445 can be defined to be sufficiently granular to consider (and differentiate between) numerous types of applications or devices provided by different service providers, network operators, or equipment vendors. A service provider, network operator, or equipment vendor can define an influence factor based on the influence factors 445. The influence factors that are defined by service providers, network operators, or equipment vendors are collectively referred to herein as "operator defined influence factors." For example, an operator defined Influence factor (Op_IF) can be defined as:

$$Op\_IF = f(\alpha SubIF + \beta DtcIF),$$

where f( ) is a function, SubIF=Subscriber Class Influence Factor, DtcIF=Device type Category Influence Factor, and $\alpha$ and $\beta$ are relative importance factors for the two influence factors.

Some embodiments of the agent 425 store (or have access to) information indicating device characteristics 450. Examples of device characteristics include characteristics of an application type that is used to generate queries to the device or a type of radio access technology (RAT) supported by the device—such as a cellular RAT that operates in a licensed frequency band (e.g., LTE) or a non-cellular RAT that operates in an unlicensed frequency band (e.g., IEEE 802.11 or Wi-Fi). In some embodiments, the device characteristics 450 include information indicating availability of the user equipment 415. The device characteristics 450 can include information indicating that queries should only be sent in response to a message transmitted by the user equipment 415. In that case, the user equipment 415 can transmit data and, in response to the transmission, listen for a predetermined time interval to receive a query from the agent 425. For example, the agent 425 can receive a message that includes an identifier of the user equipment 415 and then if (or when) queries are available for the user equipment 415, the agent 425 can transmit the queries over a selected control plane path or user plane path during the predetermined time interval. The time criticality of the query can be relatively high (e.g., mission-critical or time critical) if the user equipment 415 is only available to receive the query during the predetermined time interval. The device characteristics 450 can also include information indicating a time interval in which the user equipment 415 is configured to receive queries. For example, the device characteristics 450 can include information defining a time interval during which a radio in the user equipment 415 is turned on and in a listening mode, as opposed to a transmitting mode. For another example, the device characteristics 450 can include a predetermined schedule for transmission of the queries from the agent 425 to the user equipment 415. In some embodiments, queries are also associated with a time interval or expiration time. If the query is not handled within the time interval (or prior to the expiration time), the query expires and is dropped. A notification can be sent to the user equipment 415 to indicate that the query has expired or been dropped.

Once the agent 425 has selected a communication path through the network 420, the agent 425 applies an admission control algorithm to determine whether the query is likely to be admitted for transmission along the selected communication path in a current time interval. The agent 425 can then selectively admit or queue the query based on the results of the admission control algorithm. For example, the agent 425 can admit the query for transmission along the selected communication path in the current time interval if the admission control algorithm indicates that the scheduling mechanisms implemented in the network 420 are likely to allocate resources along the communication path for transmission of the query. For another example, the agent 425 can queue the query for transmission in a subsequent time interval if the admission control algorithm indicates that the scheduling mechanisms implemented in the network 420 are not likely to allocate resources along the communication path for transmission of the query in the current time interval. Queries can be queued by storing them in a buffer 455, which can be implemented in the agent 425 or external to the agent 425, e.g., in the network 420.

Figure 5:
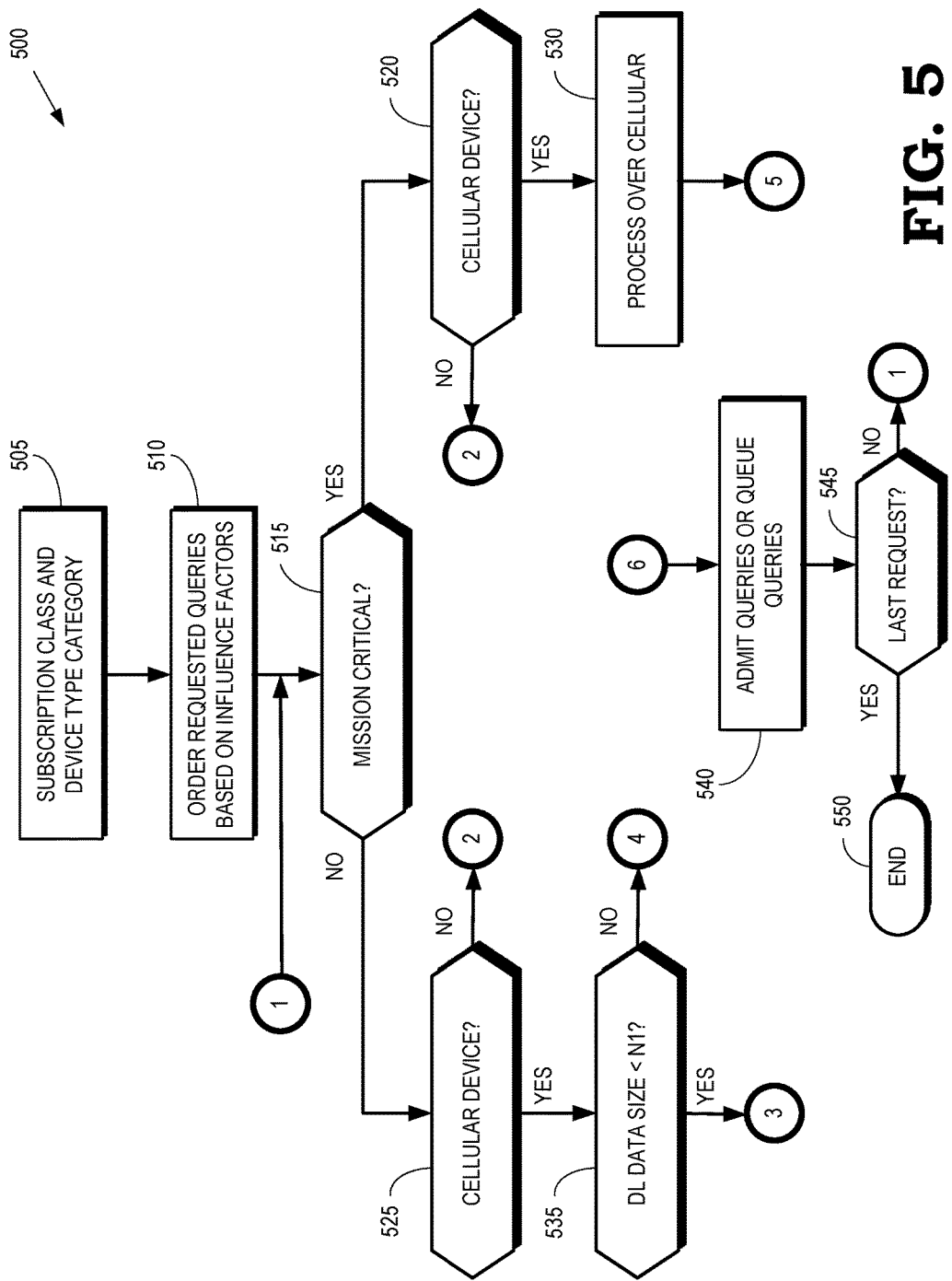
FIG. 5 is a flow diagram of a first portion of a method of selecting communication paths for queries from application servers and selectively admitting the queries for transmission along the communication path according to some embodiments.

FIG. 5 is a flow diagram of a first portion 500 of a method of selecting communication paths for queries from application servers and selectively admitting the queries for transmission along the communication path according to some embodiments. The first portion 500 of the method is implemented in some embodiments of the agent 175 implemented in the wireless communication system 100 shown in FIG. 1 and the agent 425 implemented in the wireless communication system 400 shown in FIG. 4. The method is performed iteratively in successive time intervals, which can have durations on the order of seconds.

At block 505, the agent determines subscription classes and device type categories for queries received from an application server in a request to transmit the queries during the current time interval. The queries are addressed to devices such as the user equipment 110 shown in FIG. 1 or the user equipment 415 shown in FIG. 4. At block 510, the agent orders the queries based on influence factors such as the operator-defined influence factors discussed herein. The order is determined so that queries that have larger values of influence factors come first in the order and queries that have lower values of the influence factors come later in the order. Some embodiments of the agent categorize the queries based on time criticality of the queries. For example, queries can be placed into categories or buckets corresponding to mission-critical queries, time critical queries, and delay tolerant queries. The queries within each category are then ordered and then the categories are ordered based on the time criticality. For example, mission-critical queries are first in the order, time critical queries are second in the order, and delay tolerant queries are third in the order.

The queries are then processed on a query-by-query basis in the determined order. Although not shown in FIG. 5, some embodiments of the method determine if a broadcast flag in the request for the query that is currently being processed by the agent. If so, the agent selects an MBMS broadcast mechanism to transmit the query over a cellular RAT. The agent therefore provides the request to an MBMS server, which processes the request according to conventional MBMS techniques. If the broadcast flag for a query is not set, the agent evaluates the request for admission as discussed below.

At decision block 515, the agent determines whether the request is for a mission critical query. Mission-critical queries are always admitted irrespective of current network conditions. Thus, if the request is a mission critical query, the method flows to decision block 520. The agent can then select a communication path for the mission critical query using cellular access, Wi-Fi access, or another RAT. As discussed herein, the selected communication path can include a control plane path or a user plane path that is selected based on a device state, size of data, a number of devices addressed by the request, or other factors. If the request is not a mission critical query, the method flows to decision block 525.

At decision block 520, the agent determines whether cellular access is operational on the device. If so, the method flows to block 530 and the agent begins processing the request for cellular access. The method flows from block 530 to the node 5 for further processing of the request, as discussed below. If cellular access is not operational on the device, the method flows to node 2 for further processing of the request, as discussed below.

At decision block 525, the agent determines whether cellular access is operational on the device. If not, the method flows to node 2 for further processing of the request, as discussed below. If cellular access is operational on the device, the method flows to decision block 535. The agent compares (at decision block 535) a data size associated with the query that is to be transmitted on the downlink towards the device (or devices). If the data size is less than a first threshold (N1), the method flows to node 3 for further processing of the request, as discussed below. If the data size is greater than the first threshold, the method flows to node 4 for further processing of the request, as discussed below. In some embodiments, the number of bytes in the first threshold is a standardized value such as a value established by the 3GPP standards.

The portion 500 of the method also includes block 540, which is reached via the node 6. At block 540, the agent proceeds to admitting the queries along the selected communication path during the current time interval or queuing the queries for a subsequent time interval. Conventional queuing mechanisms can be used to handle buffered queries. As discussed in detail below, prior to reaching the node 6, the agent selectively admits queries for transmission to the device (or devices) in the current time interval or queues the queries for transmission in a subsequent time interval, e.g., by storing the queries in a buffer. Some embodiments of the agent selectively admit or queue the queries by applying an admission algorithm to the network elements along the communication path that is selected for the query. For example, a control plane path via an SCEF includes the SCEF, an MME, and a base station. A control plane path via an SMS server includes the SMS server, an MSC, an MME, and the base station. A user plane path includes a PDN gateway, a serving gateway, and the base station. The Wi-Fi path includes a wireless local area network (WLAN) gateway and a Wi-Fi access point that can be implemented in a radio access network. The method then flows from block 540 to decision block 545. If the agent determines that the last request in the ordered list of requests has not been processed, the method flows to the node 1 and the agent begins processing the next request in the order determined in block 510 of FIG. 5. If the agent determines that the last request in the ordered list of requests has been processed, the method flows to block 550 and ends.

For each request, the agent verifies that the devices are operating in the correct mode to receive data in the communication mode required by the selected communication path. For example, if a control plane SCEF path has been selected, the agent verifies that bearer identifiers have been assigned to identify traffic for the device over a T6a interface between the MME and the SCEF. Then, for each network element along the selected communication path, the agent can determine the current load on the network element and adjust a budget of total requests to be admitted by considering the current load and any recent changes in the load. Additional requests can be added to a potential list for the network element as long as the total cost of serving the request does not exceed the current budget for all requests. This process is repeated for each network element and each request. The agent then selects a set of requests that includes requests that are allowed for all types of network elements in their corresponding communication paths.

Figure 6:
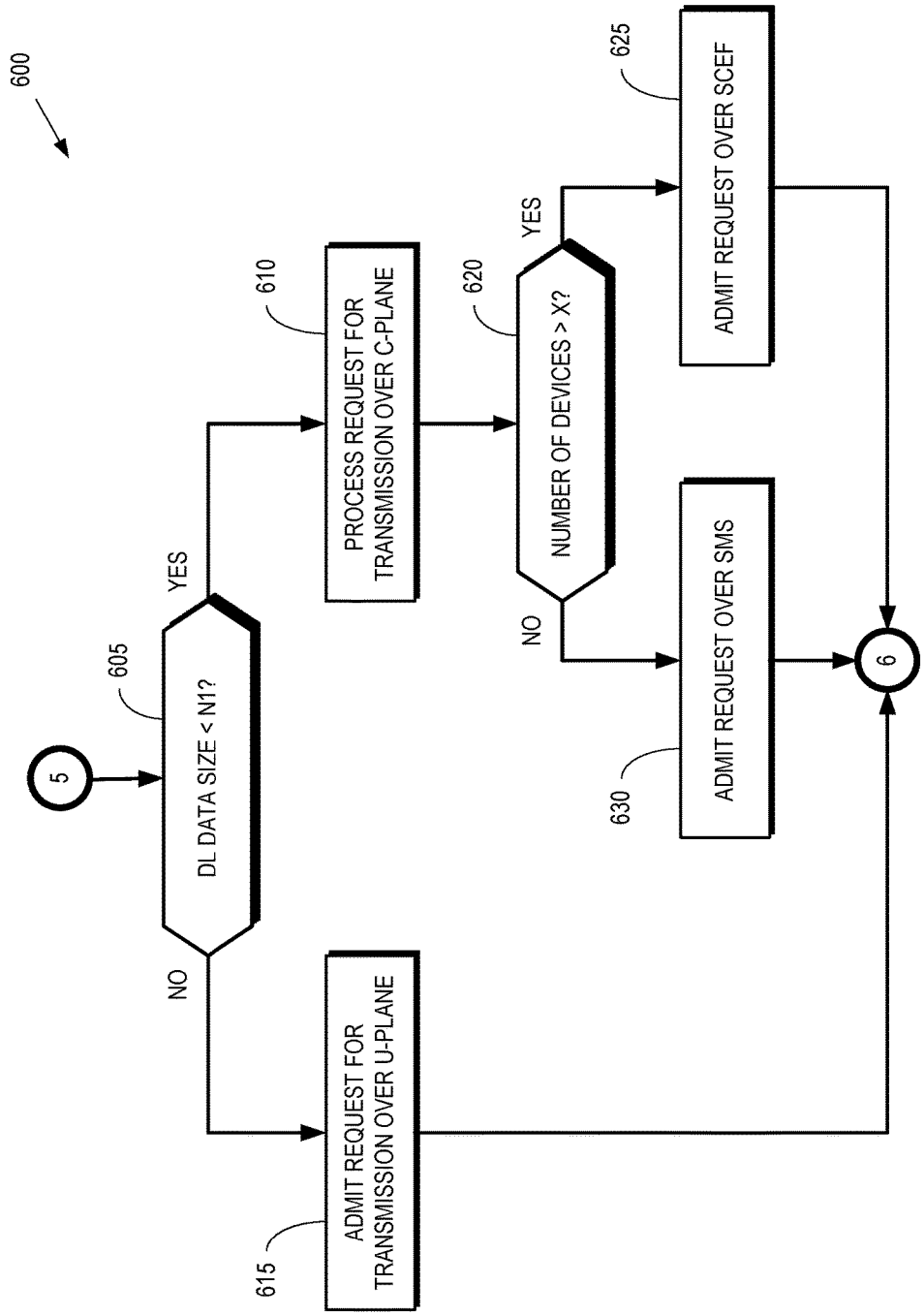
FIG. 6 is a flow diagram of a second portion of a method of selecting communication paths for mission-critical queries from application servers and selectively admitting the queries for transmission along the communication path according to some embodiments.

FIG. 6 is a flow diagram of a second portion 600 of a method of selecting communication paths for queries from application servers and selectively admitting the queries for transmission along the communication path according to some embodiments. The second portion 600 can be implemented in conjunction with the first portion 500 of the method that is illustrated in FIG. 5. The second portion 600 of the method is implemented in some embodiments of the agent 175 implemented in the wireless communication system 100 shown in FIG. 1 and the agent 425 implemented in the wireless communication system 400 shown in FIG. 4.

The second portion 600 begins at node 5 and so the method flows from the block 530 shown in FIG. 5 to decision block 605 shown in FIG. 6. At decision block 605, the agent determines whether a size of data in the query that is to be transmitted over the downlink is less than a first threshold (N1). If so, the method flows to block 610. If the size of data is greater than or equal to the first threshold, the method flows to block 615. The first threshold used in the second portion 600 is equal to the first threshold used in the comparison performed at block 535 shown in FIG. 5. However, in some embodiments the agent may utilize different thresholds for the comparisons that are performed at decision block 535 and decision block 605. In some embodiments, the number of bytes in the first threshold used in decision block 605 is a standardized value such as a value established by the 3GPP standards.

At block 610, the request is processed for transmission over a control plane path and the method flows to decision block 620. The agent compares a number of devices that are targeted by the query indicated in the request to a threshold number (X) of devices at decision block 620. If the number of devices is greater than the threshold number, the agent admits the request for transmission of the query over an SCEF control plane path at block 625. The method then flows from block 625 or block 630 to the node 6. If the number of devices is less than or equal to the threshold number, the agent admits the request for transmission of the query over an SMS control plane path at block 630.

At block 615, the request is processed for transmission of the query over a user plane path. The method then flows from block 615 to the node 6.

Figure 7:
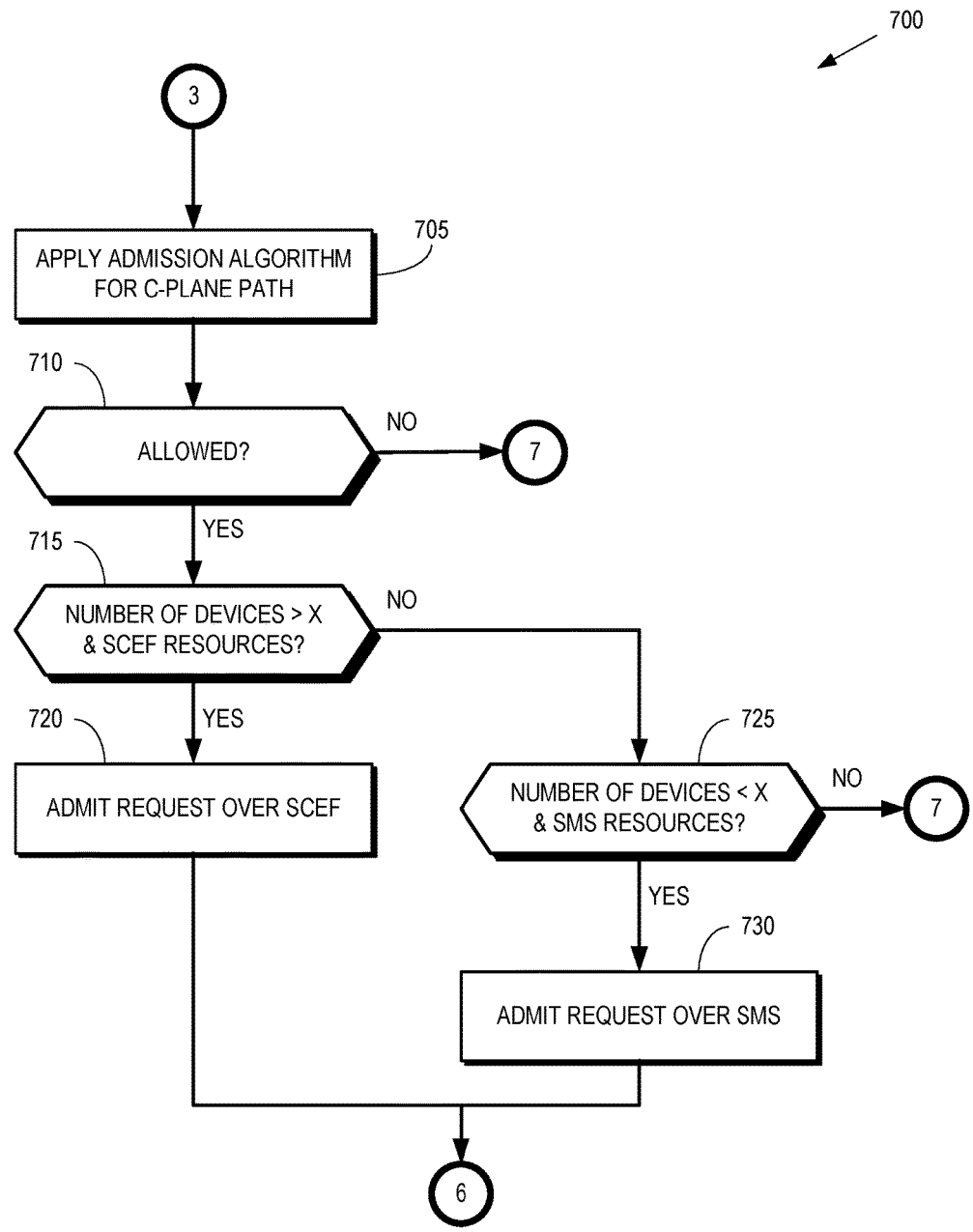
FIG. 7 is a flow diagram of a third portion of a method of selecting communication paths for non-mission-critical queries from application servers and selectively admitting the queries for transmission along the communication path according to some embodiments.

FIG. 7 is a flow diagram of a third portion 700 of a method of selecting communication paths for queries from application servers and selectively admitting the queries for transmission along the communication path according to some embodiments. The third portion 700 can be implemented in conjunction with the first and second portions 500, 600 of the method that is illustrated in FIGS. 5 and 6. The third portion 700 of the method is implemented in some embodiments of the agent 175 shown in FIG. 1 and the agent 425 shown in FIG. 4.

The third portion 700 begins at node 3 and so the method flows from the decision block 535 shown in FIG. 5 to block 705 shown in FIG. 7 in response to the agent determining that the size of the data is less than the first threshold at decision block 535.

At block 705, the agent applies an admission algorithm to the network elements along a control plane path. For example, a control plane path via an SCEF includes the SCEF, an MME, and a base station. A control plane path via an SMS server includes the SMS server, an MSC, an MME, and the base station. The agent verifies that the devices that are targeted by the request are operating in the correct mode to receive data via a control plane path. For example, the agent verifies that bearer identifiers have been assigned to identify traffic for the device over a T6a interface between the MME and the SCEF for a control plane path via the SCEF. Then, for each network element along the control plane paths, the agent determines the current load on the network element and adjusts a budget of total requests to be admitted by considering the current load and any recent changes in the load. Additional requests can be added to a potential list for the network element as long as the total cost of serving the request does not exceed the current budget for all requests. This process is repeated for each network element and each request.

At decision block 710, the agent determines whether the admission algorithm indicates that the request is allowed. For example, the agent can determine whether the request is allowed for each network element along each of the control plane paths, e.g., the control plane paths via the SCEF and the SMS. If not, the method flows to node 7. If the agent determines that the request is allowed for the control plane paths, the method flows to decision block 715.

At decision block 715, the agent compares a number of devices targeted by the request to a threshold number (X) of devices. In the illustrated embodiment, the threshold number used in decision block 715 is the same as the threshold number used in the decision block 620 shown in FIG. 6. However, some embodiments may use different threshold numbers in the decision block 620, 715. The agent also determines whether there are sufficient resources available on the control plane paths to be allocated to the request. If the number of devices is greater than the threshold and there are sufficient resources available on the SCEF control plane path to support the requested query, the method flows to block 720 and the request is admitted for transmission over the SCEF control plane path. If the number of devices is less than the threshold, or if there are insufficient resources available on the SCEF path, the method flows to decision block 725.

At decision block 725, the agent compares the number of devices to the threshold number and evaluates the availability of resources on the SMS control plane path. If the number of devices is less than or equal to the threshold number and there are sufficient resources on the SMS control plane path to support the requested query, the method flows to block 730 and the request is admitted for transmission of the query over the SMS control plane path. If the number of devices is greater than the threshold number, or if there are insufficient resources on the SMS control plane path to support the requested query, the method flows to node 7. The method flows from block 720 or block 730 to the node 6.

Figure 8:
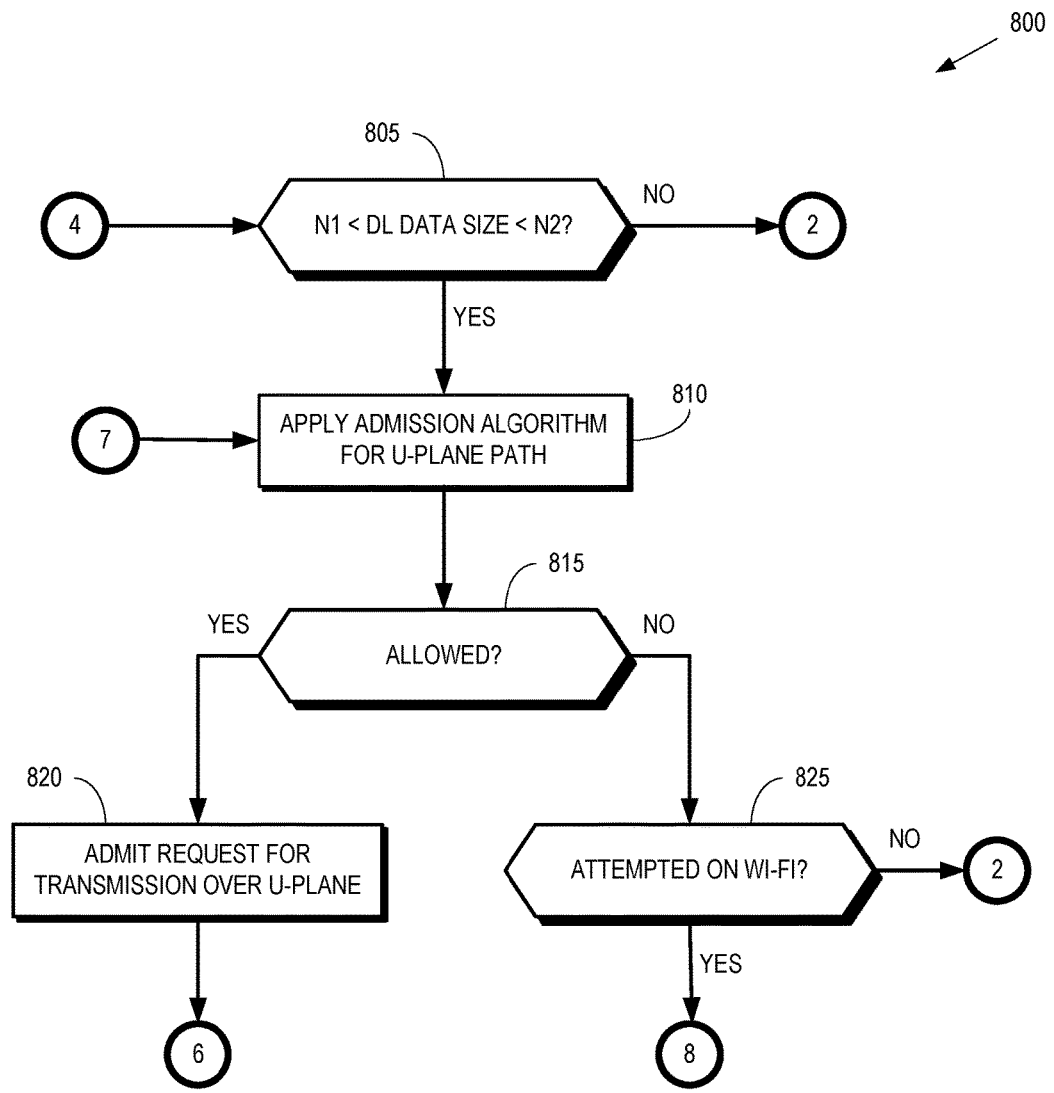
FIG. 8 is a flow diagram of a fourth portion of a method of selecting communication paths for non-mission-critical queries from application servers and selectively admitting the queries for transmission along the communication path according to some embodiments.

FIG. 8 is a flow diagram of a fourth portion 800 of a method of selecting communication paths for non-mission critical queries from application servers and selectively admitting the queries for transmission along the communication path according to some embodiments. The fourth portion 800 can be implemented in conjunction with the first, second, and third portions 500, 600, 700 of the method that is illustrated in FIGS. 5-7. The fourth portion 800 of the method is implemented in some embodiments of the agent 175 shown in FIG. 1 and the agent 425 shown in FIG. 4.

The fourth portion 800 begins at node 4 and so the method flows from the decision block 535 shown in FIG. 5 to decision block 805 shown in FIG. 8 in response to the agent determining that the size of the data is greater than or equal to the first threshold at decision block 535. At decision block 805, the agent compares the data size to the first threshold (N1) and a second threshold (N2) that is greater than the first threshold. If the agent determines that the data size is greater than the second threshold, the method flows to node 2. If the agent determines that the data size is greater than or equal to the first threshold and less than the second threshold, the method flows to block 810. The method also flows to block 810 via node 7, e.g., if the agent determines that admission to a control plane path is not allowed at decision block 710 shown in FIG. 7 or if the agent determines that a number of devices targeted by the query is greater than a threshold number or insufficient SMS resources are available at decision block 725 shown in FIG. 7.

At block 810, the agent applies an admission algorithm to the network elements along a user plane path. For example, a user plane path includes a PDN gateway, a serving gateway, and the base station. The agent verifies that the devices that are targeted by the request are operating in the correct mode to receive data via the user plane path. Then, for each network element along the user plane path, the agent determines the current load on the network element and adjusts a budget of total requests to be admitted by considering the current load and any recent changes in the load. Additional requests can be added to a potential list for the network element as long as the total cost of serving the request does not exceed the current budget for all requests. This process is repeated for each network element and each request.

At decision block 815, the agent determines whether the admission algorithm indicates that the request to transmit the query along the user plane path is allowed. If so, the method flows to block 820 and the request is admitted for transmission of the query over the user plane. The method flows from block 820 to node 6.

If the admission algorithm indicates that the request is not allowed at decision block 815, the method flows to decision block 825. The agent determines whether there has been a previous attempt to admit the request via a Wi-Fi communication path at decision block 825. If there has been a previous attempt on Wi-Fi, the method flows to node 8. If there has not been a previous attempt on Wi-Fi, the method flows to node 2.

Figure 9:
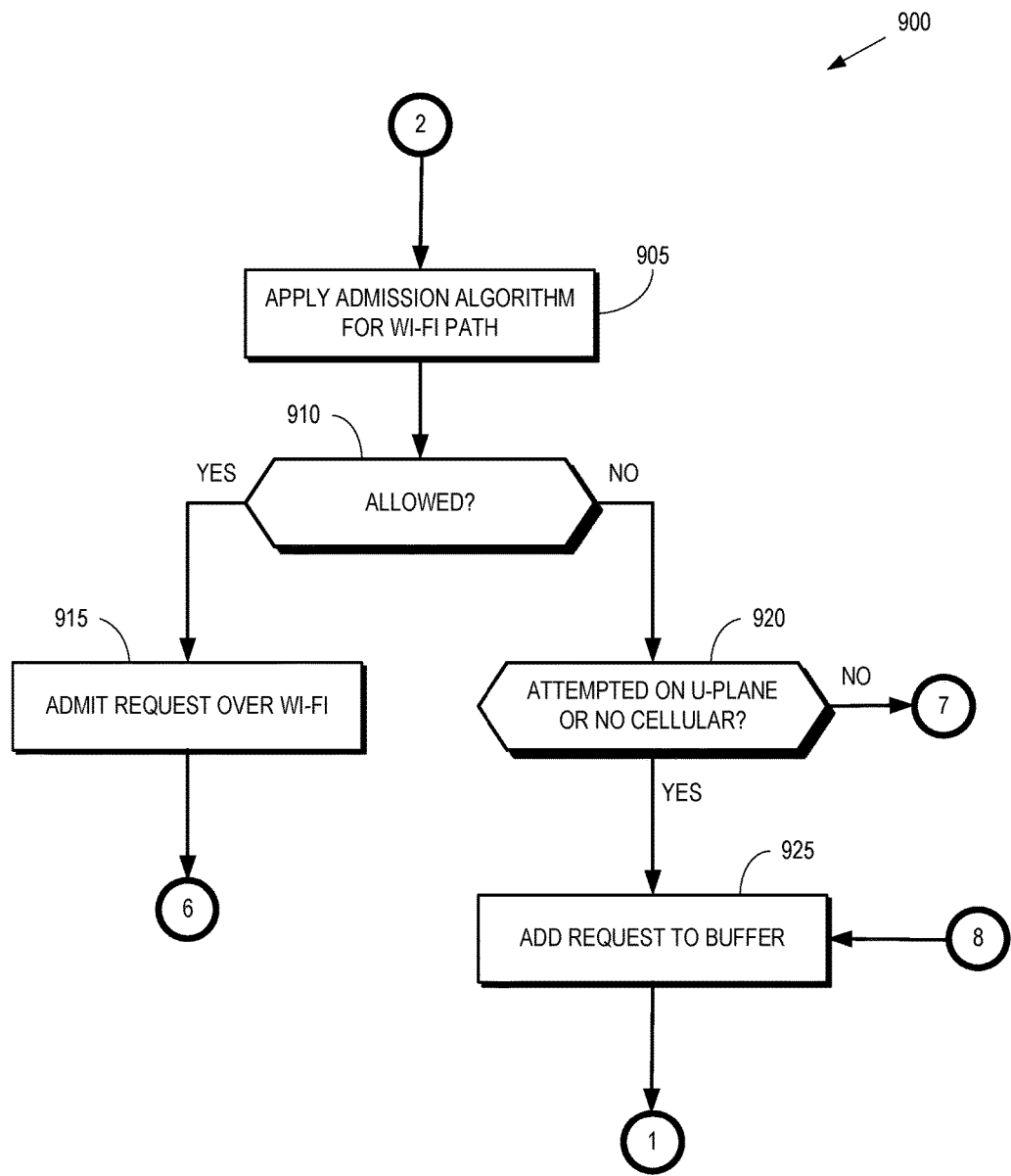
FIG. 9 is a flow diagram of a fifth portion of a method of selecting communication paths for all queries from application servers and selectively admitting the queries for transmission along the communication path according to some embodiments.

FIG. 9 is a flow diagram of a fifth portion 900 of a method of selecting communication paths for queries from application servers and selectively admitting the queries for transmission along the communication path according to some embodiments. The fourth portion 900 can be implemented in conjunction with the first, second, third, and fourth portions 500, 600, 700, 800 of the method that is illustrated in FIGS. 5-8. The fifth portion 900 of the method is implemented in some embodiments of the agent 175 shown in FIG. 1 and the agent 425 shown in FIG. 4.

The fifth portion 900 begins at node 2. The method flows to node 2 from the decision blocks 520, 525 shown in FIG. 5 in response to determining that the targeted device does not support cellular communication, from the decision block 805 shown in FIG. 8 in response to determining that the size of the data is greater than the second threshold, and from the decision block 825 shown in FIG. in response to determining that there has not been a previous attempt to admit the request on the Wi-Fi communication path. The method flows from node 2 to block 905.

At block 905, the agent applies an admission algorithm to the network elements along a Wi-Fi communication path. For example, a Wi-Fi communication path includes a wireless local area network (WLAN) gateway and a Wi-Fi access point that can be implemented in a radio access network. The agent verifies that the devices that are targeted by the request are operating in the correct mode to receive data via the Wi-Fi communication path. Then, for each network element along the user plane path, the agent determines the current load on the network element and adjusts a budget of total requests to be admitted by considering the current load and any recent changes in the load. Additional requests can be added to a potential list for the network element as long as the total cost of serving the request does not exceed the current budget for all requests. This process is repeated for each network element and each request.

At block 910, the agent determines whether the admission algorithm indicates that the request to transmit the query along the Wi-Fi communication path is allowed. If so, the method flows to block 915 and the request is admitted for transmission over the Wi-Fi communication path. The method flows from block 915 to the node 6.

If the request to transmit the query along the Wi-Fi communication path is not allowed, the method flows to decision block 920. At decision block 920, the agent determines whether a previous attempt has been made to admit the request over the user plane. The agent also determines whether cellular communication is operational on the targeted device. If there has not been a previous attempt to admit the request over the user plane and the targeted device is cellular-enabled, the method flows to node 7, which is the entry point for the block 810 of the method shown in FIG. 8. If there has been a previous attempt to admit the request over the user plane, or if cellular is not operational on the targeted device, the method flows to block 925. The method also flows to block 925 via the node 8 from the decision block 825 shown in FIG. 8 in response to the agent determining that a previous attempt has been made on Wi-Fi.

At block 925, the agent adds the request to a buffer so that the request is queued for transmission in a subsequent time interval. For example, the agent can add the request to a buffer such as the buffer 455 in the agent 425 shown in FIG. 4. The method then flows to node 1 and the method begins another iteration to process another request for a query in the order determined in block 510 shown in FIG. 5.

Figure 10:
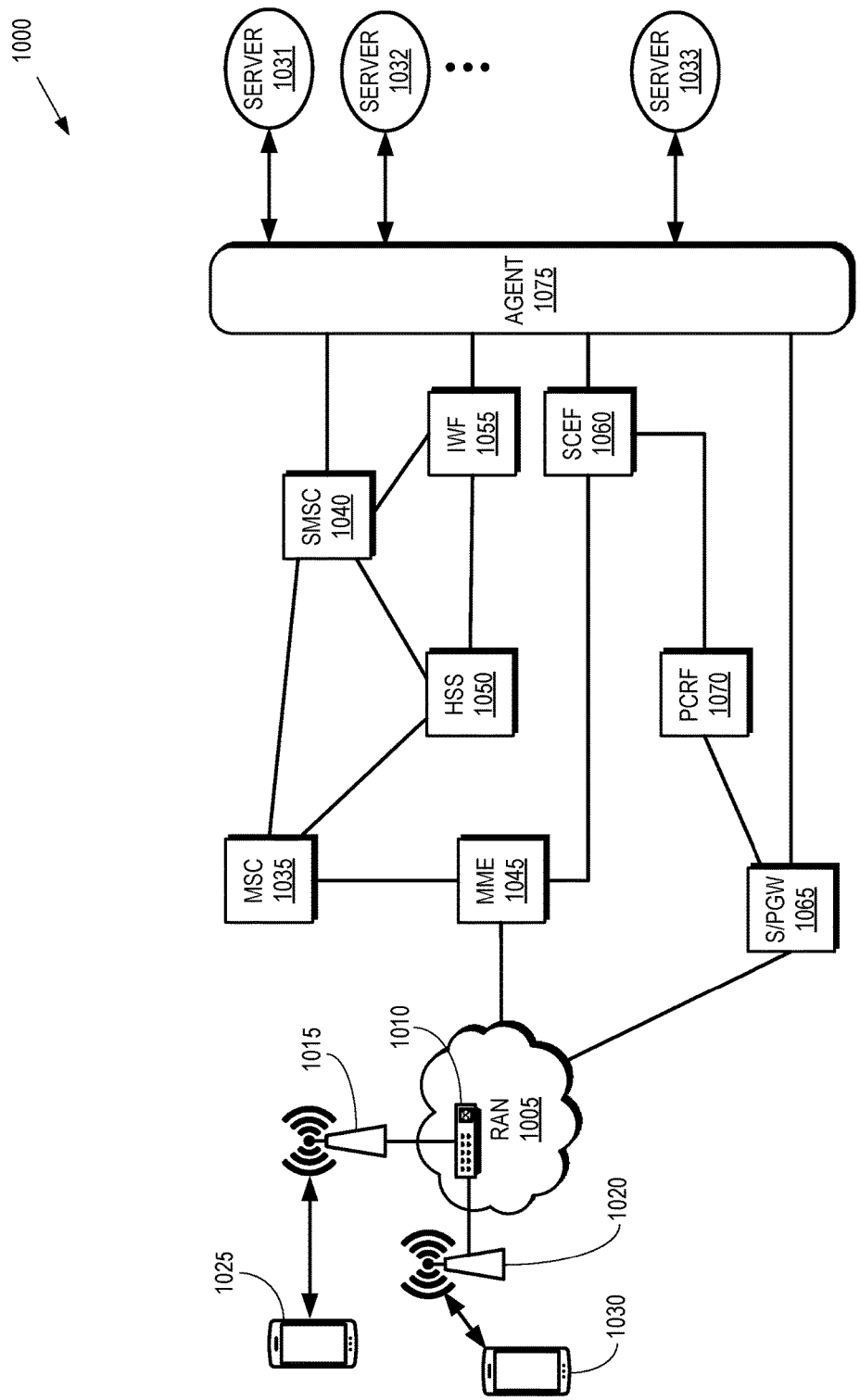
FIG. 10 illustrates a third example of a wireless communication system according to some embodiments.

FIG. 10 illustrates a third example of a wireless communication system 1000 according to some embodiments. The wireless communication system 1000 is configured to support wireless communication according to multiple radio access technologies (RATs) including cellular communication according to 3GPP standards and non-cellular communication according to other RATs such as Wi-Fi and IEEE 802.11. The wireless communication system 1000 therefore includes a radio access network 1005 that includes one or more edge access points 1010 that are connected to one or more cellular base stations 1015 and one or more non-cellular base stations 1020. Some embodiments of the edge access point 1010 can function as a WLAN gateway for the non-cellular base station 1020. The cellular base station 1015 provides wireless connectivity to a cellular-enabled user equipment 1025 and the non-cellular base station 1020 provides wireless connectivity to a user equipment 1030. However, in some embodiments, the user equipment 1025, 1030 are configured to support multiple RATs including cellular and non-cellular RATs so that the user equipment 1025, 1030 can establish wireless connections with either the cellular or non-cellular base stations 1015, 1020.

The wireless communication system 1000 includes network elements that are configured to support multiple communication paths between the user equipment 1025, 1030 and application servers 1031, 1032, 1033 (collectively referred to herein as "the servers 1031-1033"). As discussed herein, the communication paths can include control plane paths and user plane paths to cellular-enabled user equipment 1025 and non-cellular RAT communication paths to the user equipment 1030. The network elements include an MSC 1035, an SMSC 1040, an MME 1045, an HSS 1050, an IWF 1055, a SCEF 1060, a serving/PDN gateway 1065, and a policy control and rules function (PCRF) 1070. The PCRF 1070 is configured to determine and disseminate policy rules in the wireless communication system 1000. The other network elements operate as discussed herein.

An agent 1075 is configured to receive requests from the servers 1031-1033 to transmit queries to the user equipment 1025, 1030 via one of the multiple communication paths in the wireless communication system 1000. Some embodiments of the agent 1075 are configured to selectively admit the queries for transmission along different communication paths from the servers 1031-1033 to the user equipment 1025, 1030 in response to the queries including different sizes of data that is to be sent to the user equipment 1025, 1030. The agent 1075 also selects the communication paths based on numbers of the devices that are to receive the queries, as well as other characteristics of the queries, the user equipment 1025, 1030, or the network elements in the wireless communication system 1000, as discussed herein. The agent 1075 can then transmit the queries via the selected communication paths, which may include immediately transmitting the queries in the current time interval or buffering the queries for transmission in a subsequent time interval.

Embodiments of the techniques described herein for selecting optimum communication paths between application servers and devices such as user equipment or IoT devices have a number of advantages over conventional practice. By deploying the agent in front of application servers and across all of the communication paths simplifies the design of the application servers because they do not need to be aware of the network related details that are used to select the optimal communication path. Furthermore, the agent is application-aware, network-aware, and able to improve network resource usage, reliability, and quality-of-experience by selecting the communication paths on a per-query basis, as well as allowing time critical queries to reach their destination in a timely manner by selecting communication paths having a relatively low latency. Implementing a separate agent also reduces operational costs because no pre-configuration is required. This is in contrast to conventional designs that require service providers or network operators to pre-determine communication paths for each device. The conventional approach does not support selecting different communication paths based on the application that generated the query or other characteristics of the query. Moreover, the application server has no knowledge of the network conditions and so the application server is unable to use network-related information to choose a communication path for a query. Overall, this can result in a waste of network resources and degradation of key performance indicators, which can lead to a loss of revenue for service providers or mobile network operators.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   receiving, at an agent and from an application server in a communication network, a query directed to a device in the communication network;
   selecting, at the agent, a communication path from a plurality of communication paths from the application server to the device, wherein the plurality of communication paths comprises at least one wireless sub-path over an air interface, and wherein the communication path is selected based on a data size of the query, a number of devices that are to receive the query, or a combination thereof, wherein selecting the communication path from the plurality of communication paths comprises selecting a control plane communication path in response to the query having the data size that is below a first threshold, and wherein selecting the control plane communication path comprises selecting a control plane communication path including a service capability exposure function (SCEF) in response to the number of devices receiving the query exceeding a second threshold; and
   transmitting, from the agent, the query via the selected communication path.

2. The method of claim 1, wherein selecting the communication path comprises selecting a communication path based upon whether the communication path is supported by a cellular or a non-cellular radio access technology.

3. The method of claim 1, further comprising:
   accessing, at the agent, first information indicating time criticality of the query; and
   wherein selecting the communication path comprises selecting the communication path based on whether the first information indicates that the query is a mission critical query having a high priority for transmission in a current time interval, a time critical query having a medium priority for transmission in the current time interval, a delay tolerant query having a low priority for transmission in the current time interval, or a combination thereof.

4. The method of claim 3, further comprising:
   accessing second information indicating at least one of a subscription class of a user of the device, a category of a type of the device, an operator-defined influence factor, or a combination thereof; and
   using the second information to determine an order of a plurality of queries including the query.

5. The method of claim 4, further comprising:
   associating the plurality of queries with timing categories based on the first information, and
   wherein using the second information to determine the order of the plurality of queries comprises using the second information to determine orders for the queries in the timing categories.

6. The method of claim 4, wherein selecting the communication path for the query comprises selecting communication paths for the plurality of queries in the order determined based on the second information.

7. The method of claim 1, further comprising:
   accessing third information indicating network conditions along the communication path; and
   selectively admitting the query for transmission along the communication path in a current time interval or queuing the query for transmission in a subsequent time interval based on the third information.

8. The method of claim 1, wherein selecting the control plane communication path comprises selecting a control plane communication path including a short message service (SMS) server in response to the number of devices receiving the query being below a second threshold.

9. The method of claim 1, wherein transmitting the query via the selected communication path comprises transmitting non-access stratum (NAS) signaling representative of the query.

10. The method of claim 1, wherein selecting the communication path from the plurality of communication paths comprises selecting a user plane communication path in response to the query having the data size that is above a first threshold.

11. The method of claim 10, further comprising:
    establishing a bearer for the user plane communication path, and
    wherein transmitting the query comprises transmitting the query using the bearer.

12. A method of claim 1, wherein selecting the communication path comprises receiving an indication that the query is to be broadcast and providing the query to a multimedia broadcast/multicast service (MBMS) server for broadcast.

13. A method comprising:
    receiving, at an agent and from an application server in a communication network, a query directed to a device in the communication network;
    selecting, at the agent, a communication path from a plurality of communication paths from the application server to the device, wherein the plurality of communication paths comprises at least one wireless sub-path over an air interface, and wherein the communication path is selected based on a data size of the query, a number of devices that are to receive the query, or a combination thereof, wherein selecting the communication path from the plurality of communication paths comprises selecting a user plane communication path in response to the query having the data size that is above a first threshold, wherein the query is a non-mission critical query, and wherein selecting the communication path from the plurality of communication paths comprises selecting the user plane communication path in response to the non-mission critical query having the data size that is above the first threshold and below a third threshold, and wherein selecting the communication path from the plurality of communication paths comprises selecting a non-cellular communication path in response to the non-mission critical query having the data size that is above the third threshold; and transmitting, from the agent, the query via the selected communication path.

14. An apparatus, comprising:

network hardware configured to receive a query from an application server in a communication network, wherein the query is directed to a device in the communication network;

computing hardware configured to select a communication path from a plurality of communication paths from the application server to the device, wherein the plurality of communication paths comprises at least one wireless sub-path over an air interface, and wherein the communication path is selected based on a data size of the query and a number of devices that are to receive the query, or a combination thereof, wherein selecting the communication path from the plurality of communication paths comprises selecting a control plane communication path in response to the query having the data size that is below a first threshold, and wherein selecting the control plane communication path comprises selecting a control plane communication path including a service capability exposure function (SCEF) in response to the number of devices receiving the query exceeding a second threshold; and wherein the network hardware is configured to transmit the query via the selected communication path.

15. The apparatus of claim 14, wherein the computing hardware is configured to select a communication path supported by a cellular or a non-cellular radio access technology.

16. The apparatus of claim 14, further comprising:

storage hardware configured to store first information indicating time criticality of the query; and wherein the computing hardware is configured to select the communication path based on whether the first information indicates that the query is a mission critical query having a high priority for transmission in a current time interval, a time critical query having a medium priority for transmission in the current time interval, or a delay tolerant query having a low priority for transmission in the current time interval.

17. An apparatus, comprising:

network hardware configured to receive a query from an application server in a communication network via a communication path that is selected from a plurality of communication paths from the application server to the apparatus, wherein the plurality of communication paths comprise at least one wireless sub-path over an air interface, and wherein the communication path is selected based on a data size of the query and a number of devices that are to receive the query, or a combination thereof, wherein selecting the communication path from the plurality of communication paths comprises selecting a control plane communication path in response to the query having the data size that is below a first threshold, and wherein selecting the control plane communication path comprises selecting a control plane communication path including a service capability exposure function (SCEF) in response to the number of devices receiving the query exceeding a second threshold; and computing hardware configured to perform an action based on data included in the query.

\* \* \* \* \*